(12) United States Patent
Kobayashi et al.

(10) Patent No.: US 11,361,448 B2
(45) Date of Patent: Jun. 14, 2022

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventors: Kiwamu Kobayashi, Kawasaki (JP); Akihiro Matsushita, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 179 days.

(21) Appl. No.: 16/554,712

(22) Filed: Aug. 29, 2019

(65) Prior Publication Data

US 2020/0090342 A1 Mar. 19, 2020

(30) Foreign Application Priority Data

Sep. 19, 2018 (JP) .............................. JP2018-175088

(51) Int. Cl.
| | | |
|---|---|---|
| *G06T 7/194* | (2017.01) | |
| *G06T 7/529* | (2017.01) | |
| *G06T 7/11* | (2017.01) | |
| *G06T 5/00* | (2006.01) | |

(52) U.S. Cl.
CPC .............. *G06T 7/194* (2017.01); *G06T 5/002* (2013.01); *G06T 7/11* (2017.01); *G06T 7/529* (2017.01)

(58) Field of Classification Search
None
See application file for complete search history.

(56) References Cited

U.S. PATENT DOCUMENTS

| | | | | |
|---|---|---|---|---|
| 6,141,433 | A | * 10/2000 | Moed ................... | G01S 3/7865 348/143 |
| 7,447,380 | B2 | * 11/2008 | Williams ................. | G06T 7/97 382/215 |
| 10,839,573 | B2 | * 11/2020 | Marino .................... | G06T 7/44 |
| 2006/0078224 | A1 | * 4/2006 | Hirosawa ............. | H04N 5/2353 382/284 |

(Continued)

FOREIGN PATENT DOCUMENTS

JP 2001043458 A 2/2001

*Primary Examiner* — Oneal R Mistry
*Assistant Examiner* — Nicolas James Boyajian
(74) *Attorney, Agent, or Firm* — Carter, DeLuca & Farrell LLP

(57) ABSTRACT

Provided is an image processing apparatus comprising: one or more memories that store a set of instructions; and one or more processors that execute the instructions to obtain a plurality of inputted images that are contiguously captured, perform determination of a first region based on the obtained inputted images, the first region being formed from pixels each having a change in pixel value below a predetermined threshold in a predetermined period, the determination being performed in each of a plurality of the continuous predetermined periods, determine a second region based on a plurality of the first regions determined in the plurality of the continuous predetermined periods, respectively, determine a third region by subjecting image data representing the determined second region to image processing, and update a background image based on the obtained inputted images and any of the determined third region.

20 Claims, 12 Drawing Sheets

(56) References Cited

U.S. PATENT DOCUMENTS

| | | | |
|---|---|---|---|
| 2011/0243451 A1* | 10/2011 | Oyaizu | G06T 5/50 |
| | | | 382/190 |
| 2015/0125032 A1* | 5/2015 | Yamanaka | G06K 9/00624 |
| | | | 382/103 |
| 2017/0186179 A1* | 6/2017 | Miyano | G08B 13/19604 |
| 2017/0293413 A1 | 10/2017 | Matsushita et al. | |
| 2018/0165052 A1* | 6/2018 | Kim | G06F 3/14 |
| 2019/0114753 A1* | 4/2019 | Li | G06T 7/194 |

* cited by examiner

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to a technique for generating a background image from a captured image.

Description of the Related Art

There is a technique for generating a background image from a captured image captured by using a camera. Japanese Patent Laid-Open No. 2001-43458 (hereinafter referred to as a reference 1) discloses a technique designed to detect a difference between a first input image stored in a frame buffer and a second input image captured at one time point before the first input image, and to count up pixels from which changes are detected. The reference 1 also discloses a concept of using these pixels for updating a background image in a case where the counted-up value reaches a predetermined value.

The difference thus detected does not always show an appropriate value due to a change in image capturing environment or due to effect of noise. The technique according to the reference 1 is designed to update the background image on the pixel basis. For this reason, this technique may develop so-called isolated points that may lead to create defect points in a region supposed to be updated as a background or to create pixels to be updated which do not actually have to be updated as a background. As a consequence, there is a possibility of a failure to generate an appropriate background image.

SUMMARY OF THE INVENTION

An aspect of the present invention provides an image processing apparatus comprising: one or more memories that store a set of instructions; and one or more processors that execute the instructions to obtain a plurality of inputted images that are contiguously captured, perform determination of a first region based on the obtained inputted images, the first region being formed from pixels each having a change in pixel value below a predetermined threshold in a predetermined period, the determination being performed in each of a plurality of the continuous predetermined periods, determine a second region based on a plurality of the first regions determined in the plurality of the continuous predetermined periods, respectively, determine a third region by subjecting image data representing the determined second region to image processing, and update a background image based on the obtained inputted images and any of the determined third region.

Further features of the present invention will become apparent from the following description of exemplary embodiments with reference to the attached drawings.

DESCRIPTION OF THE EMBODIMENTS

Figure 1:
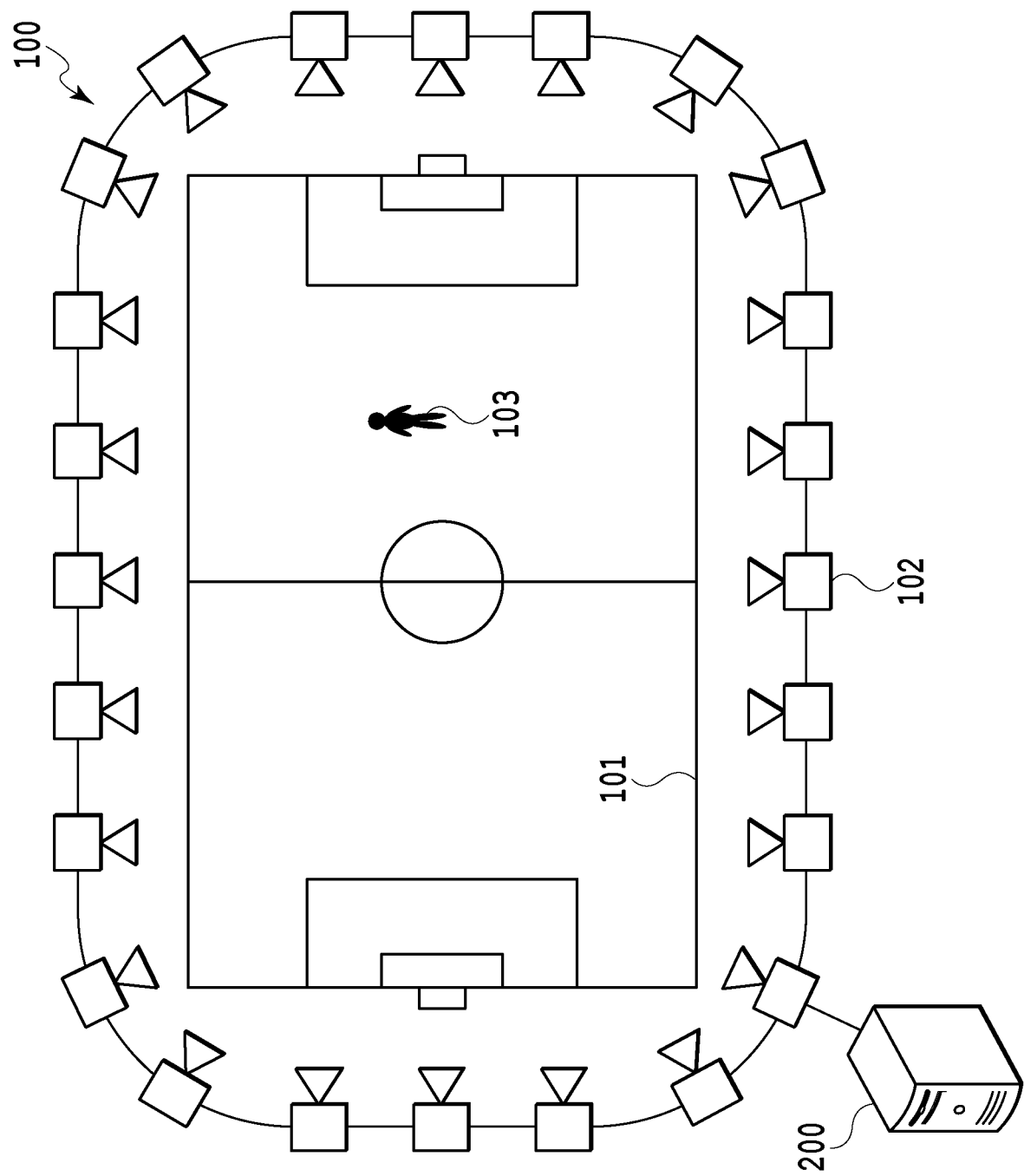
FIG. 1 is a diagram explaining a schematic configuration of a system.

Preferred embodiments of the present invention will be described below in detail with reference to the accompanying drawings. It is to be noted, however, that the configurations shown in the following embodiments are mere examples and the present invention is not limited only to the configurations illustrated therein.

First Embodiment

This embodiment explains a mode of generating a background image to be used for generating a virtual viewpoint image. First, an outline of a virtual viewpoint image will be briefly explained in order to facilitate the understanding of the embodiment. There is a technique for forming a virtual viewpoint image at an arbitrary virtual viewpoint by using images captured at multiple viewpoints. For instance, by using the virtual viewpoint image, it is possible to view highlight scenes of football and basketball games from various angles, and thus to offer high realistic sensation to user as compared to ordinary images.

Processing of modeling a foreground as a main object while separating the foreground from a background part and then rendering the modeled foreground is carried out in order to generate the virtual viewpoint image. Here, information on foreground masks corresponding to silhouettes of the foreground viewed from multiple cameras and information on textures of the foreground (such as color information on R, G, and B of respective pixels of the foreground) is required in the case of modeling the foreground.

The processing of separating the foreground from the background part is called foreground-background separation processing. The foreground-background separation processing is processing to estimate a foreground region which is generally conducted in accordance with a background differencing technique. The background differencing technique is designed to obtain a difference between a background image and an inputted image containing the foreground, and to define a foreground region as a region which is a cluster of pixels each determined to have a difference equal to or above a predetermined threshold. In short, the background image is required to obtain the foreground.

Regarding the background image, an input image captured in a state of excluding the foreground from a captured region can be generally used as the background image.

However, an image capturing environment and image capturing conditions do not always remain in the same states. In the case of outdoor image capturing, for instance, a sunlight condition changes with the time of the day. In the meantime, illuminance in the environment varies with a change in weather. Accordingly, there is a demand for generating the background image that tracks the aforementioned changes.

The following embodiment will describe a mode of generating a background image which is capable of tracking the above-mentioned change in image capturing environment and is removed of isolated points and the like. Note that this embodiment will describe an example in which the background image is used for generating the virtual viewpoint image. However, the background image does not always have to be used for generating the virtual viewpoint image. For this reason, this embodiment is not bound by relative geographic installation conditions among the multiple cameras. Moreover, this embodiment is not limited to the mode of using the multiple cameras. This embodiment may also be applied to a mode of generating a background image for an image captured with a single camera such as a monitor camera installed on a premise, at a distant place, or outdoors, for example.

<System Configuration>

FIG. 1 is a diagram explaining a schematic configuration of a system 100 of this embodiment. Multiple cameras 102 are arranged surrounding an arena 101. The multiple cameras 102 are configured to capture the arena 101 from multiple viewpoints. A sports game such as a football game takes place in the arena 101 and a person 103 as an object in a foreground is assumed to be present in the arena 101. The object is a certain person such as a player, a coach, and a referee. Meanwhile, the object may be an item with a predetermined image pattern such as a ball and a goal. In the meantime, the object may be either a stationary body or a moving body.

Each camera 102 includes input-output hardware for data transmission. The cameras 102 are connected to one another through a ring network by using network cables, for example, and are thus configured to sequentially transmit image data to adjacent cameras through the network. Specifically, each camera is configured to transmit the received image data with image data obtained by a capturing operation of its own to the next camera. One of the cameras 102 is connected to an image processing apparatus 200, and the image data from the respective cameras 102 are transmitted to the image processing apparatus 200. The image processing apparatus 200 performs processing to generate the virtual viewpoint image by using the respective pieces of the image data thus received.

<Configuration of and Processing by Image Processing Apparatus>

Figure 2A:
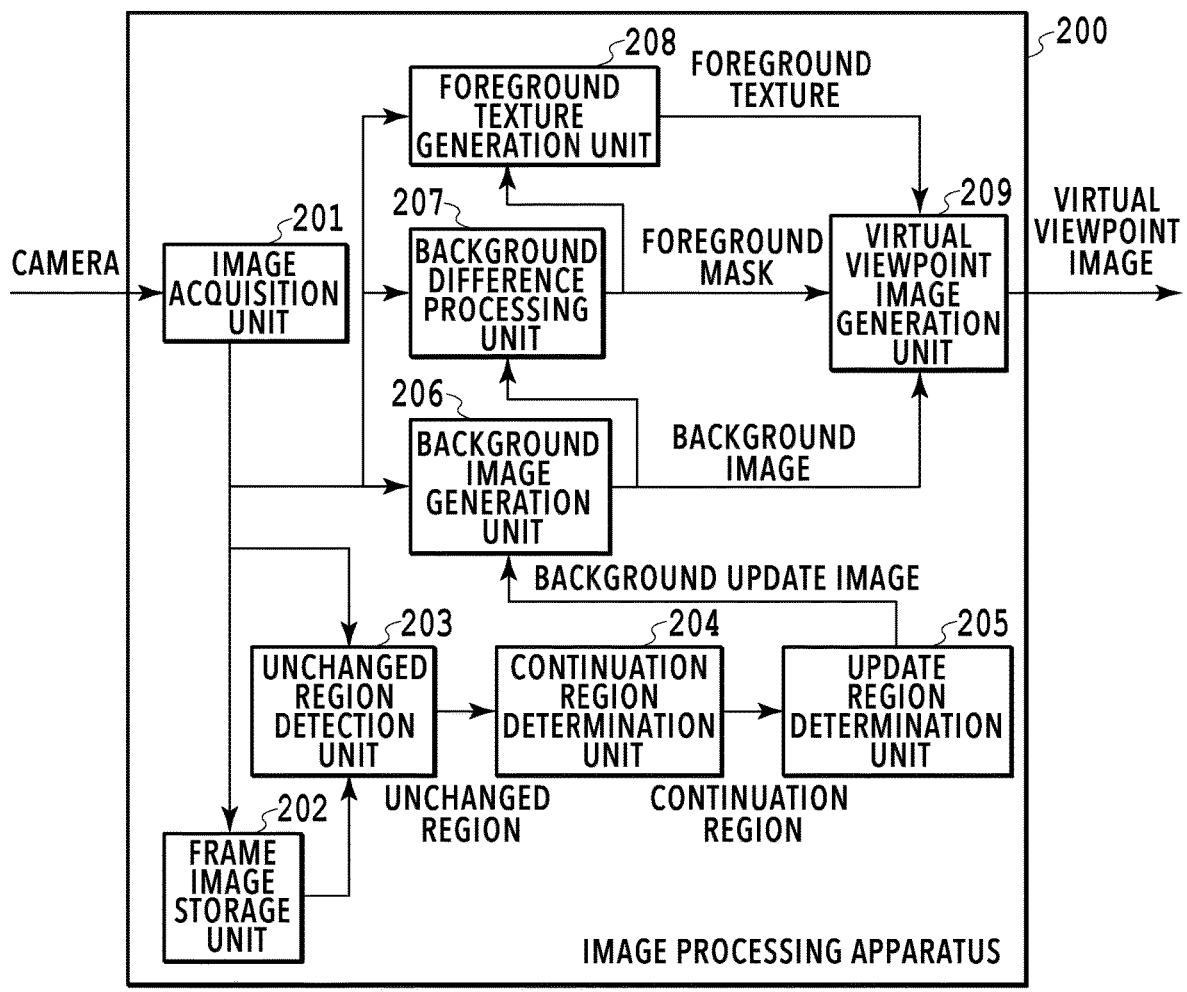
FIG. 2A is a diagram showing an internal configuration of an image processing apparatus.

FIG. 2A is a block diagram showing an internal configuration of the image processing apparatus 200. The image processing apparatus 200 includes an image acquisition unit 201, a frame image storage unit 202, an unchanged region detection unit 203, a continuation region determination unit 204, an update region determination unit 205, a background image generation unit 206, a background difference processing unit 207, a foreground texture generation unit 208, and a virtual viewpoint image generation unit 209. The image processing apparatus 200 of this embodiment includes an application specific integrated circuit (ASIC), a field programmable gate array (FPGA), and the like which are built in the image processing apparatus. The respective modules shown in FIG. 2A are embedded as hardware inside the ASIC and/or the FPGA.

Figure 2B:
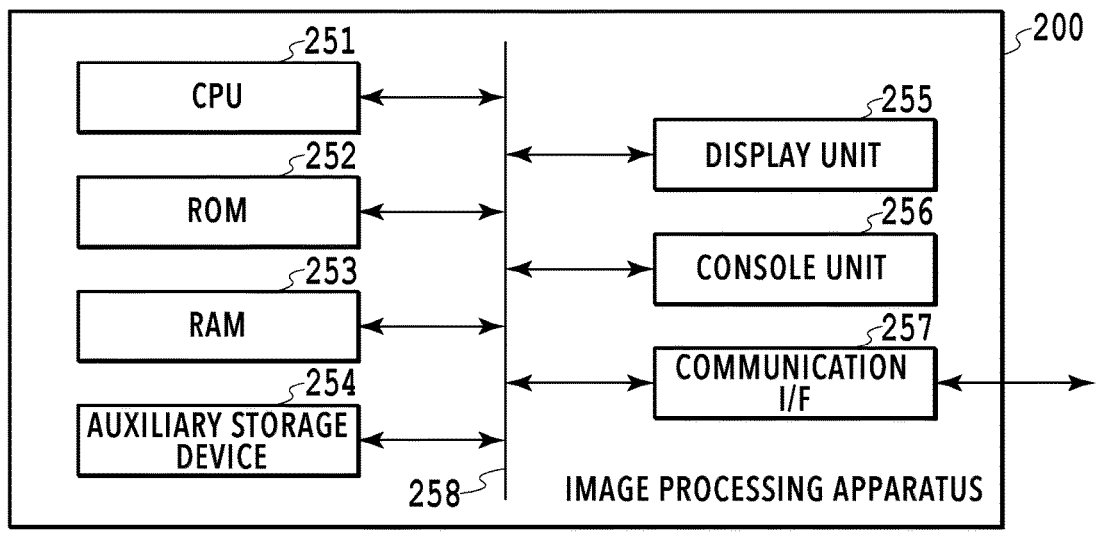
FIG. 2B is a diagram showing a hardware configuration of the image processing apparatus.

Note that the image processing apparatus 200 may be formed as an image processing apparatus that includes a CPU, a RAM, a ROM, and an auxiliary storage device (such as a HDD), for example. A hardware configuration of the image processing apparatus 200 will be described with reference to FIG. 2B. The image processing apparatus 200 includes a CPU 251, a ROM 252, a RAM 253, an auxiliary storage device 254, a display unit 255, a console unit 256, a communication I/F 257, and a bus 258.

The CPU 251 implements respective functions of the image processing apparatus 200 shown in FIG. 2A by controlling the entire image processing apparatus 200 while using computer programs and data stored in the ROM 252 and the RAM 253. Here, the image processing apparatus 200 may include one more discrete hardware units other than the CPU 251 and some of the processing originally assigned to the CPU 251 may be executed by such a discrete hardware unit instead. Examples of the discrete hardware units include the ASIC, the FPGA, a digital signal processor (DSP), and the like. The ROM 252 stores programs that are not subject to change among other things. The RAM 253 temporarily stores programs and data supplied from the auxiliary storage device 254, data supplied from outside through the communication I/F 257, and the like. The auxiliary storage device 254 is formed from a hard disk drive, for example, and stores various data including image data, sound data, and the like.

The display unit 255 is formed from a liquid crystal display unit, LEDs, and the like, and displays a graphical user interface (GUI) for allowing a user to operate the image processing apparatus 200, and so forth. The console unit 256 includes a keyboard, a mouse, a joystick, a touch panel, and the like, and inputs various instructions to the CPU 251 upon receipt of operations by the user.

The communication I/F 257 is used for communication between the image processing apparatus 200 and an external apparatus. In the case where the image processing apparatus 200 is connected by wire to the external apparatus, a communication cable is connected to the communication I/F 257. In the case where the image processing apparatus 200 has a function to wirelessly communicate with the external apparatus, the communication I/F 257 is provided with an antenna. The bus 258 establishes communication among the respective units of the image processing apparatus 200 and transmits information.

In this embodiment, the display unit 255 and the console unit 256 are provided inside the image processing apparatus 200. However, at least one of the display unit 255 and the console unit 256 may be provided outside the image processing apparatus 200 as an independent device. In this case, the CPU 251 may function as a display control unit configured to control the display unit 255 or as an operation control unit configured to control the console unit 256.

As mentioned above, the CPU 251 may be configured to read the programs stored in the ROM 252 and the like, to load the programs in the RAM 253, and thus to function as any of the units shown in FIG. 2A. In other words, the image processing apparatus 200 may implement the respective modules shown in FIG. 2A in the form of software modules.

Figure 3:
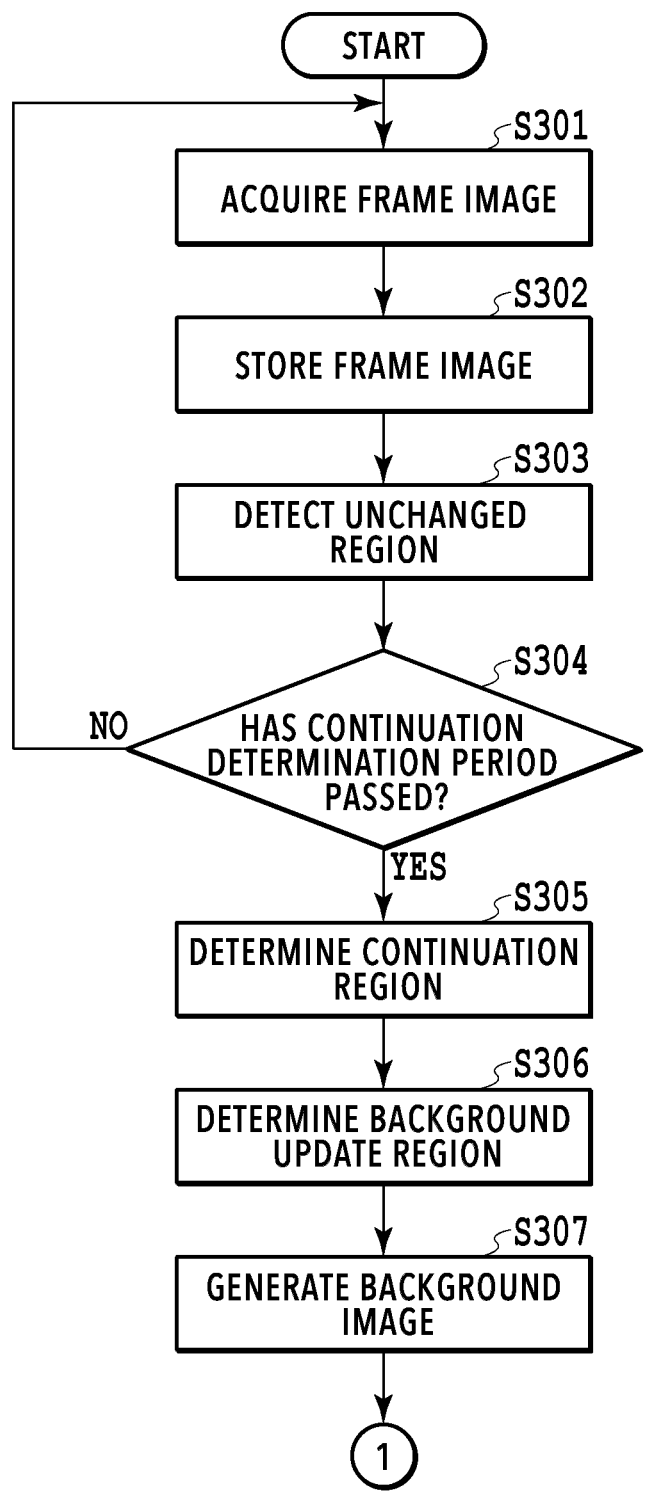
FIG. 3 is a diagram showing a flowchart.
Figure 4:
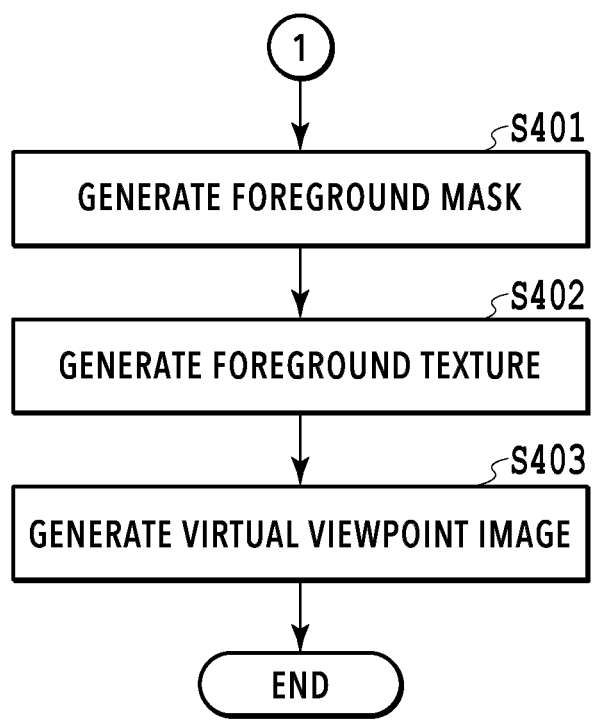
FIG. 4 is a diagram showing a flowchart.

FIGS. 3 and 4 are diagrams showing an example of flowcharts to be executed by the image processing apparatus 200. A series of processing shown in the flowcharts of FIGS. 3 and 4 is implemented by causing the CPU 251 to load program codes stored in the auxiliary storage device 254 into the RAM 253 and to execute the programs. Alternatively, all or part of the steps in FIGS. 3 and 4 may be implemented by the hardware such as the ASIC, the FPGA, and other electronic circuits. Note that a sign "S" appearing in an explanation of each piece of the processing means the step in the relevant flowchart. In the following, the configuration of the image processing apparatus 200 and an outline of the processing thereof will be described with reference to FIGS. 2A to 4.

In S301, the image acquisition unit 201 obtains the image data of the captured images captured by the cameras 102. The captured images are images such as contiguously captured still images or moving image frames. In the following, a set of images equivalent to one frame out of the contiguous images to be imputed to the image acquisition unit 201 will be referred to as a frame image. The image acquisition unit 201 subjects the obtained framed images to preprocessing including correction of swing and shake components in the images, correction of distortions in the images such as lens distortions, and adjustments such as color adjustment and gamma adjustment.

In S302, the frame image storage unit 202 stores the frame images obtained by the image acquisition unit 201. Note that the image acquisition unit 201 continuously obtains the frame images. Accordingly, at a certain time point Tx, the frame image obtained by the image acquisition unit 201 is a frame image captured at a different time point from the frame image stored in the frame image storage unit 202.

In S303, the unchanged region detection unit 203 compares the frame image newly obtained by the image acquisition unit 201 with the frame image stored in the frame image storage unit 202 on the pixel basis. Specifically, the unchanged region detection unit 203 compares a first frame image captured at a first time point and stored in the frame image storage unit 202 with a second frame image captured at a second time point after the first time point and obtained by the image acquisition unit 201. Then, the unchanged region detection unit 203 detects unchanged regions formed from the pixels each with a difference below a predetermined threshold. A period between the first time point and the second time point is referred to as a non-change detection period. Note that the unchanged region is a region that allows a certain change with the difference below the predetermined threshold, and is not always limited to a region with no changes at all. Here, each region is formed from multiple pixels. However, all the pixels do not always have to be connected to one another but may be separated into two or more parts. In the meantime, the pixels that constitute a region may be located separate from one another. Moreover, this embodiment is also applicable to a case where there is just one pixel having the difference below the predetermined threshold. The predetermined threshold may be set to an appropriate value while taking into account noise and other factors in the frame images. The unchanged region detection unit 203 outputs the unchanged regions thus detected to the continuation region determination unit 204. Details will be described later.

In S304, the continuation region determination unit 204 determines whether or not a certain determination period (referred to as a continuation determination period) has passed. The processing returns to S301 if the continuation determination period has not passed yet. The processing proceeds to S305 if the continuation determination period has passed. In S305, the continuation region determination unit 204 determines a continuation region in which the unchanged region detected in S303 has remained continuously for the continuation determination period. The continuation region determination unit 204 outputs the determined continuation region to the update region determination unit 205. Details will be described later.

In S306, the update region determination unit 205 subjects the continuation region to spatial filter processing (spatial smoothing processing such as removal of isolated points), thereby determining a background update region. The update region determination unit 205 sends the background update region thus determined to the background image generation unit 206. The spatial filter processing can determine the background update region with an improved certainty based on a spatial correlation. Details will be described later.

In S307, the background image generation unit 206 generates image data for a background image based on the frame image obtained by the image acquisition unit 201 and the background update region determined by the update region determination unit 205. For example, the background image generation unit 206 retains image data of a background image generated in a previous occasion. Then, the background image generation unit 206 updates, with pixel values of the pixels corresponding to the background update region in the frame image pixel values of the corresponding pixels in the image data for the background image generated in the previous occasion. The image data for the background image are generated by updating the background image as described above. The image data for the background image generated by the background image generation unit 206 are outputted to the background difference processing unit 207 and to the virtual viewpoint image generation unit 209.

The series of processing to generate the background image has been described above. In light of generation of the background image, the series of the processing may be terminated after the processing in S307. The background images that track the change in environment can be generated by repeating the above-described processing. Since this embodiment intends to describe the mode of generating the virtual viewpoint image, processing related to generation of the virtual viewpoint image will be described next with reference to FIG. 4. The processing shown in FIG. 4 can take place subsequent to the processing in S307.

In S401, the background difference processing unit 207 generates a foreground mask by using the frame image obtained by the image acquisition unit 201 and the background image generated by the background image generation unit 206. As described earlier, the background difference processing unit 207 performs the foreground-background separation processing (background differencing processing) to generate a mask image (the foreground mask) that indicates a foreground region. The foreground mask is outputted to the foreground texture generation unit 208 and to the virtual viewpoint image generation unit 209.

In S402, the foreground texture generation unit 208 generates a foreground texture by using the frame image obtained by the image acquisition unit 201 and the foreground mask generated by the background difference processing unit 207. The foreground texture is information on colors of R, G, B and the like of respective pixels in a region corresponding to the foreground indicated with the foreground mask, for example. The foreground texture is outputted to the virtual viewpoint image generation unit 209.

In S403, the virtual viewpoint image generation unit 209 generates the virtual viewpoint image by using the foreground texture, the foreground mask, and the background image. Here, as described earlier, the cameras 102 are installed at the positions corresponding to the multiple viewpoints. The foreground textures, the foreground masks, and the background images generated based on the captured images captured by the cameras 102 are inputted to the virtual viewpoint image generation unit 209, respectively, and the virtual viewpoint images are generated by using these data. For example, the virtual viewpoint image generation unit 209 executes three-dimensional shape estimation processing on each object present in a captured scene by using the foreground masks and the foreground textures at the multiple viewpoints. A publicly known method such as the virtual hull method that uses outline information on the object and the multi-view stereo method adopting triangulation is applicable to the method of estimation. In this way, data (such as polygon data and voxel data) representing three-dimensional shapes of the objects are generated.

Meanwhile, camera parameters of a virtual camera representing the virtual viewpoint, and the like are inputted to the virtual viewpoint image generation unit 209. The virtual viewpoint image generation unit 209 generates the virtual viewpoint image in accordance with the parameters of the virtual camera. Regarding the virtual viewpoint image, an image viewed from the virtual camera can be generated by use of computer graphics techniques while employing 3D shape data of the object obtained in the shape estimation processing. A publicly known technique is applicable to this generation processing as appropriate. The generation processing is not a key point in this embodiment and the explanation thereof will be omitted.

The configuration and the processing of the image processing apparatus 200 have been described above. Note that any of the background difference processing unit 207, the foreground texture generation unit 208, and the virtual viewpoint image generation unit 209 may be embodied as an apparatus provided separately from the image processing apparatus 200.

<Explanation of Generation of Background Image>

Figure 5:
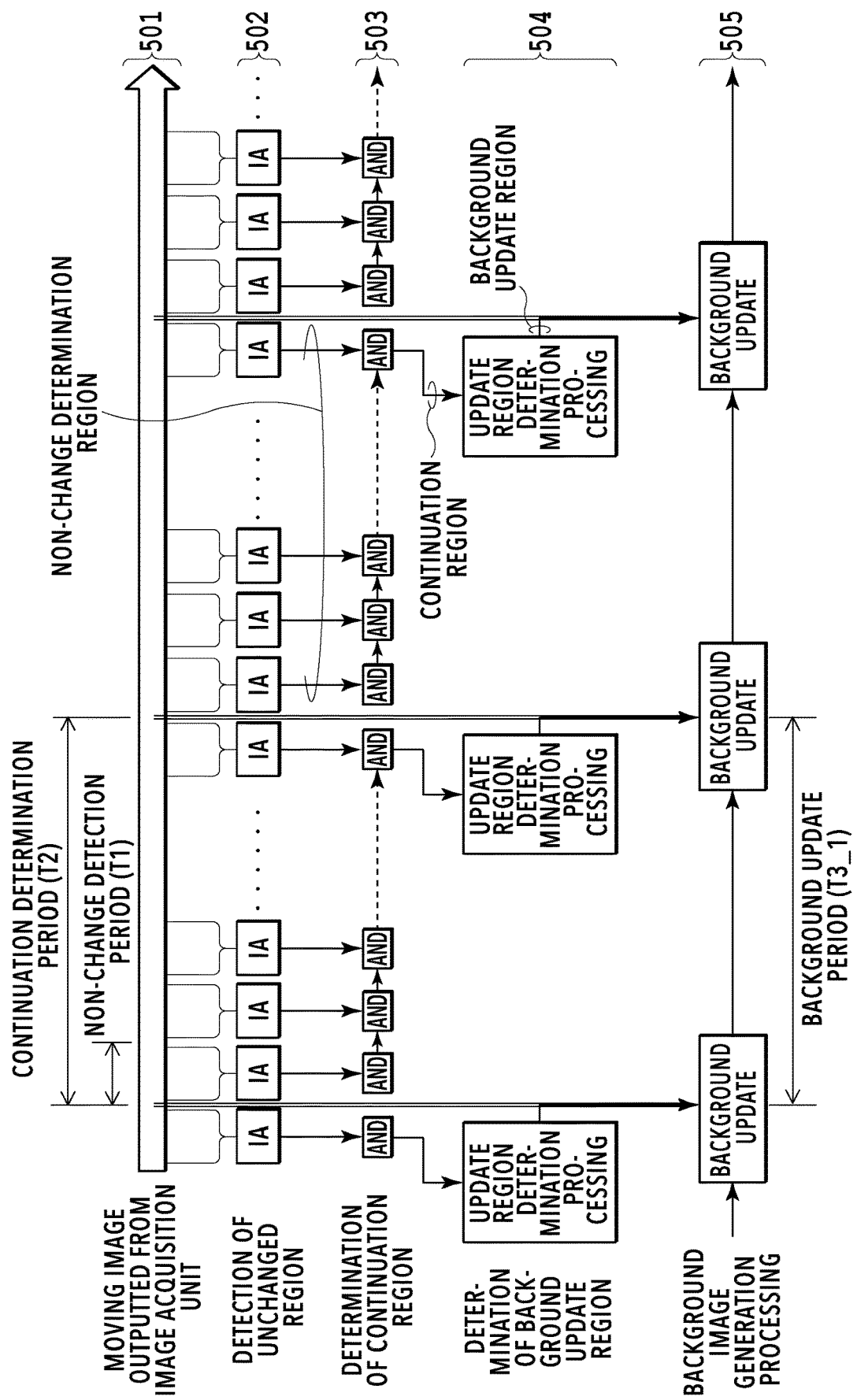
FIG. 5 is a diagram explaining processing to generate a background image.

FIG. 5 is a diagram to describe details of the processing to generate the background image, which is executed by the image processing apparatus 200. FIG. 5 shows a diagram in which a time axis moves from left to right. Note that an item 501 represents a moving image to be outputted from the image acquisition unit 201.

An item 502 represents actions of the unchanged region detection unit 203. Each unchanged region IA represents an unchanged region to be detected between the frame images with a difference in time of a non-change detection period T1 in the item 501. Specifically, the unchanged region detection unit 203 compares a first frame image obtained at a first time point with a second frame image obtained at a time point which is the time period T1 after the first time point on the pixel basis. Then, the unchanged region IA formed from the pixels each having the difference below the predetermined threshold is detected. In other words, the unchanged region IA is a region formed from the pixels each with its change in pixel value below the predetermined threshold within the non-change detection period T1 (within a first period). The non-change detection period T1 is determined as appropriate based on a moving speed of the foreground and an image angle of the captured image, for instance.

An item 503 represents actions of the continuation region determination unit 204. The continuation region determination unit 204 continuously obtains logical AND (AND) of the unchanged regions detected by the unchanged region detection unit 203 over a continuation determination period T2. In this way, the continuation region in which the unchanged region has remained continuously for the continuation determination period T2 is determined.

An item 504 represents actions of the update region determination unit 205. The update region determination unit 205 determines the background update region based on the determined continuation region. The update region determination unit 205 determines the background update region by subjecting the continuation region to the spatial filter processing.

An item 505 represents actions of the background image generation unit 206. The background image generation unit 206 generates a new background image by updating the background image generated in the previous occasion while using a region corresponding to the background update region in the frame image outputted from the image acquisition unit 201. The background image generation unit 206 sequentially generates and outputs the background images based on the background update regions that are sent from the update region determination unit 205 at intervals equivalent to the continuation determination period T2. In other words, the continuation determination period T2 corresponds to a background update period T3_1. Here, it is preferable to use the newest frame image in the continuation determination period T2 as the frame image used for generation of the background image, because it is thus possible to generate an appropriate background image at that time point while improving the performance of tracking the change in environment and so forth. Nonetheless, it is not always necessary to use the newest image in the continuation determination period T2. For example, it is also possible to use a frame image that represents several frames before the newest frame image. In other words, the background update period T3_1 does not always have to coincide with the continuation determination period T2.

Figure 6:
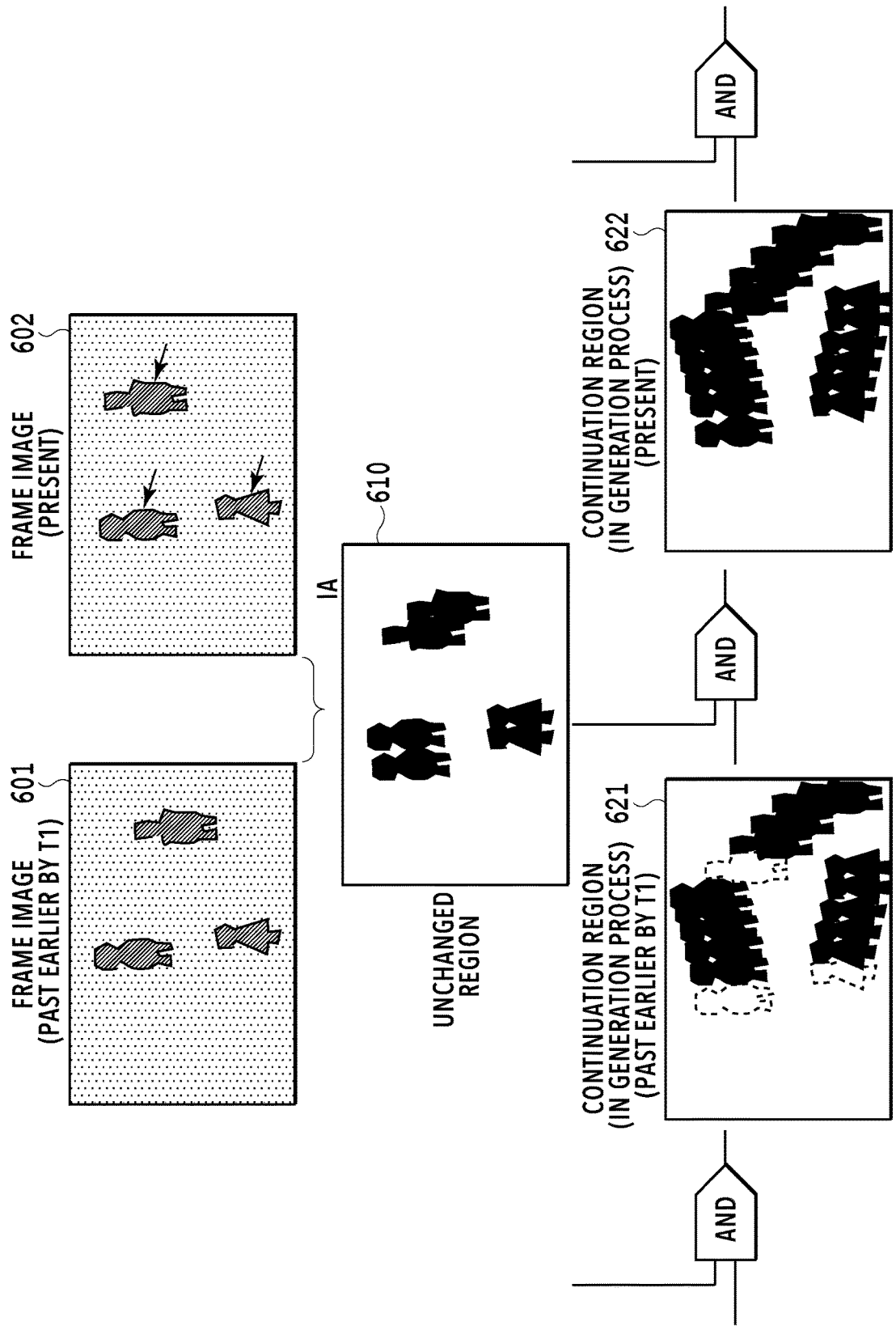
FIG. 6 illustrates diagrams showing an example of determining a continuation region.

FIG. 6 illustrates diagrams showing a specific example of determining the continuation region from the unchanged region. A frame image 602 is a present frame image outputted from the image acquisition unit 201. A frame image 601 is a past frame image that is captured earlier by the non-change detection period T1, which is stored in the frame image storage unit 202. Each arrow in the frame image 602 indicates a direction and a magnitude of movement in the non-change detection period T1 of each foreground (a person) in the frame image 601.

A mask image 610 is data (image data) representing the unchanged region detected by the unchanged region detection unit 203 and outputted therefrom. The mask image 610 is an image in which each region having a difference in pixel value between a pixel in the frame image 602 and the corresponding pixel in the frame image 601 below the predetermined threshold is shown white and each region having the aforementioned difference equal to or above the threshold is shown black. In other words, the unchanged region corresponds to a region indicated with white pixels in the mask image 610.

A lower part of FIG. 6 illustrates internal data of the continuation region determination unit 204, namely, data of the continuation regions in the generation process. The continuation region determination unit 204 sequentially obtains the logical AND (AND) of each unchanged region once in each non-change detection period T1. A mask image 621 shows the continuation region at a time point in the past that is earlier by the non-change detection period T1 than the present. Each portion indicated with a dashed line in the mask image 621 is added in the form of black pixels to the continuation region of a mask image 622 obtained at present. Note that each portion indicated with the dashed line in the mask image 621 is added for the purpose of explanation and does not exist in the actual image. The logical AND (AND) of the region with the white pixels (the unchanged region) in the mask image 610 and a region with white pixels (the continuation region) in the mask image 621 is determined as a region with the white pixels in the mask image 622. In other words, a portion where a foreground enters just once during the continuation determination period T2 is not determined as the continuation region and is indicated with the black pixels in the mask image that represents the continuation region. The continuation region determination unit 204 terminates the generation of the continuation regions in a stage where the above-mentioned processing for obtaining the logical AND has been executed a predetermined number of times, and outputs the continuation regions to the update region determination unit 205. Though the number of times to obtain the logical AND is set to eight times in this embodiment, the present invention is not limited to this configuration.

Figure 7:
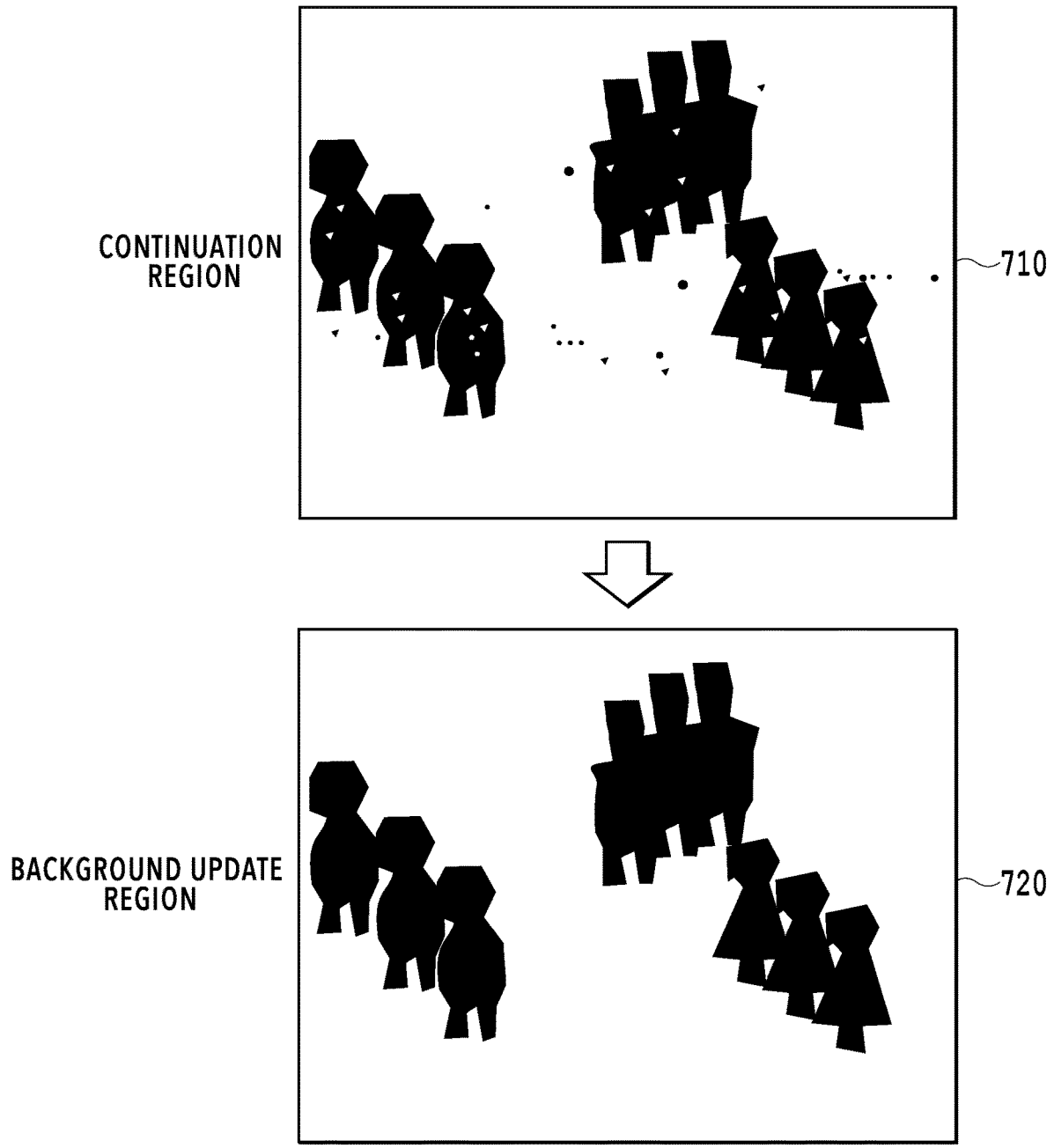
FIG. 7 illustrates diagrams explaining processing to be executed by an update region determination unit.

FIG. 7 illustrates diagrams explaining processing to be executed by the update region determination unit 205. A mask image 710 is data representing the continuation regions inputted from the continuation region determination unit 204. In this embodiment, the number of times that the continuation region determination unit 204 obtains the logical AND is eight times. If the foreground is constantly in motion, eight black silhouettes are observed for each object in accordance with its movement.

Here, the mask image 710 contains black dust (such as isolated points in various sizes) in a white part and white dust (isolated points in various sizes) in a black part. Note that illustration of isolated points is omitted in the example described in conjunction with FIG. 6. Such isolated points are likely to occur due to various factors including a change in environment, noise in the frame images, and so forth. The update region determination unit 205 removes these isolated points by the spatial filter processing, thus determining the background update region provided with the spatial correlation. A mask image 720 is data representing the determined background update region.

Note that this embodiment is configured to determine the continuation region in which the unchanged region remains continuously for a predetermined period instead of determining the background update region by counting the pixels one by one seeking for those each with the difference below the predetermined threshold. Thereafter, the background update region is determined by use of the continuation region. As described above, this embodiment is configured to perform the processing based on the continuation region provided with the spatial correlation instead of the individual pixels. As a consequence, it is possible to remove the isolated points by the spatial filter processing.

Figure 8:
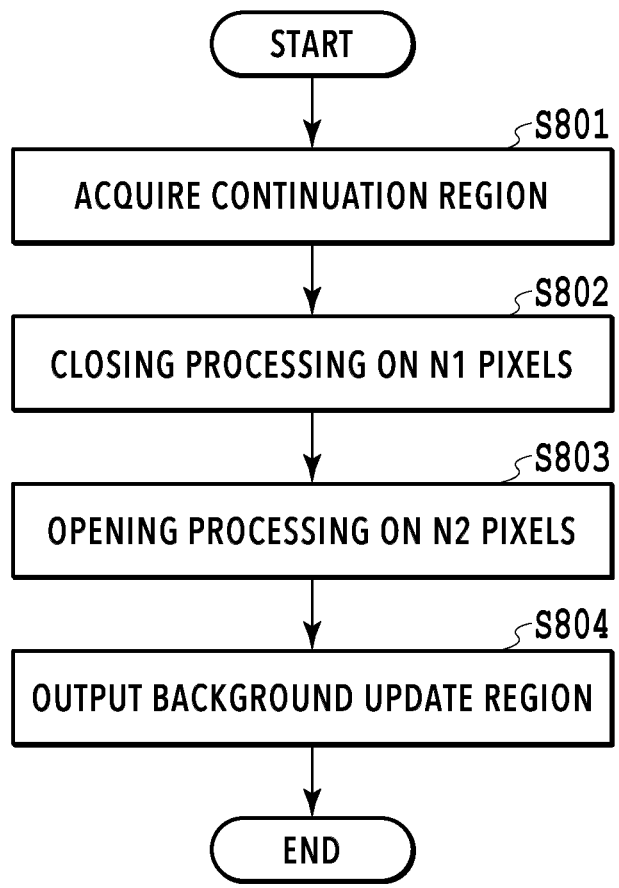
FIG. 8 is a diagram showing a flowchart to be executed by the update region determination unit.

FIG. 8 is a diagram showing an example of a flowchart to be executed by the update region determination unit 205. The spatial filter processing (the spatial smoothing processing) will be described with reference to FIG. 8.

In S801, the update region determination unit 205 obtains the data (the mask image) indicating the continuation region, which is outputted from the continuation region determination unit 204. In S802, the update region determination unit 205 subjects the obtained continuation region to closing processing. The closing processing is processing to perform expansion processing on a predetermined number of pixels (N1 pixels) and then to perform contraction processing on the same number of pixels. In other words, the closing processing is a processing to perform a set of the expansion processing and the contraction processing. The expansion processing is performed by using a filter of a predetermined size (the N1 pixels). For example, if there is one white pixel in the predetermined size, all the pixels in that size are replaced with white pixels. The expansion processing eliminates the black isolated points. However, the white region is expanded instead and the mask portion (the unchanged region) is slightly increased in size. The contraction processing is performed in order to cancel this increase. The contraction processing is performed by using a filter of the predetermined size which is the same as that in the expansion processing. Here, if there is one black pixel in the predetermined size, all the pixels in that size are replaced with black pixels. The expansion processing or the contraction processing is not limited only to this example. The expansion processing or the contraction processing may be performed by using a different method. For example, the expansion processing may be conducted in such a way that all the pixels in a prescribed size are replaced with white pixels if the number of white pixels or a proportion of the white pixels in the prescribed size exceeds a predetermined threshold. In this case, the contraction processing may also be performed in conformity to the expansion processing. The black noise in the white portions of the mask image 710 in FIG. 7 is eliminated as a consequence of performing the above-described closing processing. Note that the value N1 is determined based on size distribution of the noise.

In S803, the update region determination unit 205 performs opening processing. In the opening processing, the contraction processing is performed on a predetermined number of pixels (N2 pixels) and then the expansion processing is performed on the same number of pixels. The white noise in the black portions is eliminated as a consequence of performing the above-described opening processing. Note that the value N2 is determined based on size distribution of the noise.

Here, the closing processing in S802 and the opening processing in S803 may be performed in reverse order or may be repeated several times in combination. Meanwhile, the spatial smoothing processing to be performed by the update region determination unit 205 does not always have to be the above-mentioned combination of the opening processing and the closing processing. For example, a majority of the color (black or white) of the pixels may be determined by using the filter in the predetermined size and all the pixels in the predetermined size may be replaced with the pixels of the color having the majority. Alternatively, labeling may be conducted in terms of each type of noise, and then the area of each label may be obtained so as to determine whether or not the noise should be removed depending on the size of the area. For instance, a region (a group of pixels) having a label with the area smaller than a predetermined value may be removed. After all, the spatial smoothing processing only needs to be performed based on the spatial information instead of isolated information on each of the pixels.

Figure 9:
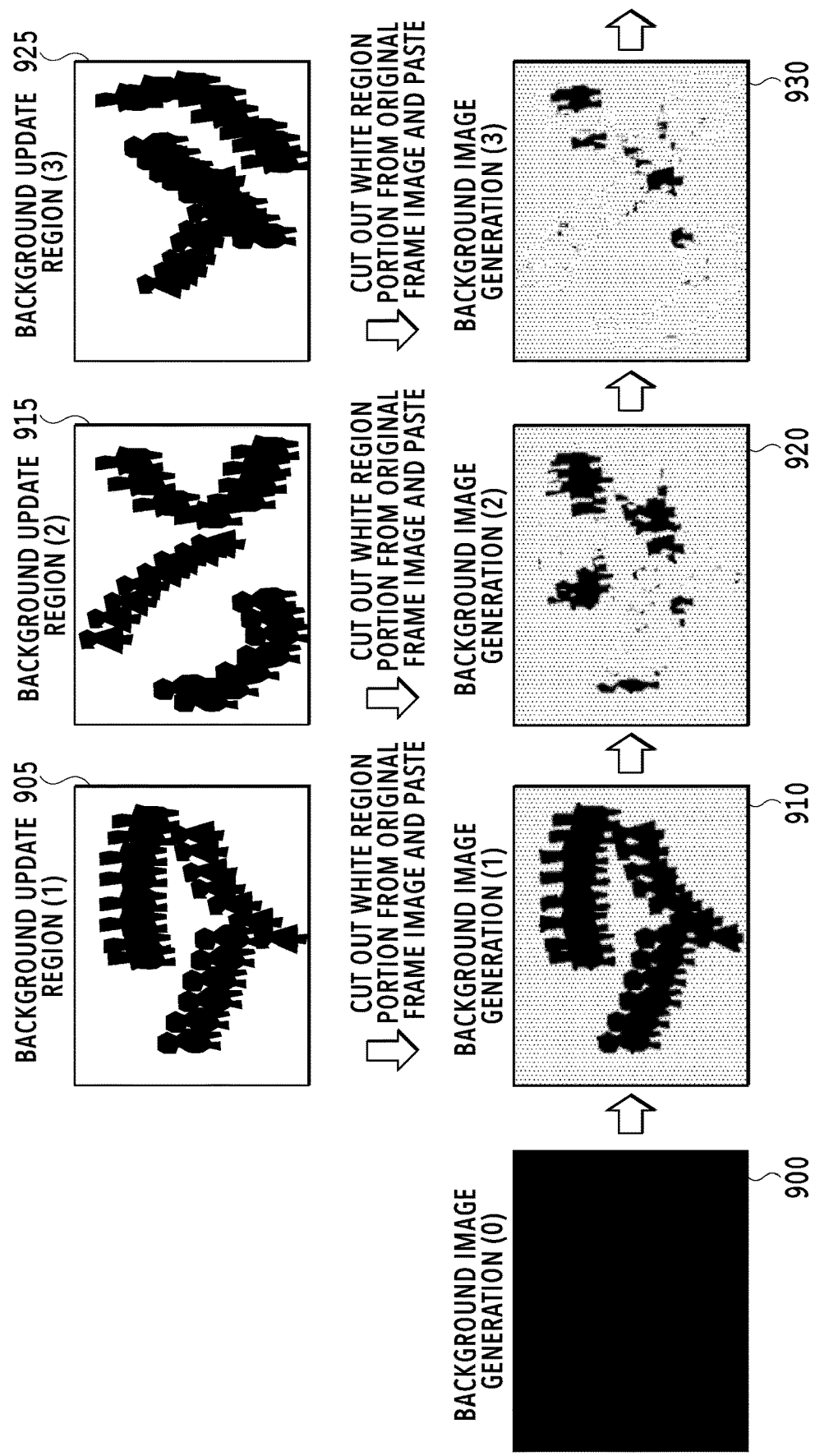
FIG. 9 illustrates diagrams showing processing to be executed by a background image generation unit.

FIG. 9 illustrates diagrams showing processing of the items 504 and 505 in FIG. 5, namely, the processing to be executed by the background image generation unit 206.

Mask images 905, 915, and 925 at an upper part of FIG. 9 are data representing the background update regions outputted from the update region determination unit 205. Background images 900, 910, 920, and 930 at a lower part of FIG. 9 are image data representing the background images to be generated by the background image generation unit 206. A portion in a dotted pattern in each of the background images at the lower part of FIG. 9 represents the background. In the case of a stadium, for instance, the background is a field or more specifically a turf and the like. The lower part of FIG. 9 illustrates the background images to be sequentially outputted from the background image generation unit 206 at the intervals of the background update period T3_1. In both of the upper part and the lower part of FIG. 9, the images proceed step by step from left to the right in FIG. 9 in the order of (0), (1), (2), and (3) at the intervals of the background update period T3_1, for example.

Then, in each step, the newest background image is overwritten with the background region obtained by cutting a region corresponding to a portion shown white in the mask image at the upper part of FIG. 9 out of the newest frame image at the background update period T3_1. Note that the background image 900 is illustrated as an entirely black image in order to represent of a leading end portion of the continuous processing.

As the steps proceed from left to the right in the order of (1), (2), (3), and so forth in FIG. 9, the dotted-pattern portions are sequentially added. In other words, the backgrounds are written over and over. After the steps are repeated several times, the background image without voids (without any black portions in the image) is generated.

As described above, this embodiment determines the continuation region in which the unchanged region has remained continuously for the predetermined period. The background update region is determined by subjecting the continuation region to the spatial processing. Then, the background image is generated by using the background update image. By performing the above-described processing, it is possible to generate the background image by using the background update region removed of the isolated points. Thus, an appropriate background image can be generated. Moreover, this embodiment can generate the background image while tracking a change in environment such as a sequential change in weather in real time.

Second Embodiment

The first embodiment has described the case in which the continuation determination period T2 and the background update period T3_1 are substantially equal to each other. Meanwhile, this embodiment will describe a case of setting the background update period shorter than the continuation determination period by providing multiple continuation region determination units.

In the system described in the first embodiment, the chance of mixture of a foreground having less movement into a background is reduced more as the continuation determination period T2 is longer. As a consequence, stability of the generated background image is improved. On the other hand, the frequency to generate (update) the background image is increased more as the background update period T3_1 is shorter. As a consequence, the performance of tracking the change in environment is improved in the generated background image. The first embodiment is the case where the continuation determination period T2 and the background update period T3_1 are set substantially equal to each other, and the stability and the tracking performance are in a trade-off relation.

This embodiment will describe a case of providing the multiple continuation region determination units so that the background update period can be set shorter than the continuation determination period, thereby improving the stability of the background image and improving the performance of the background image to track the change in environment at the same time.

Figure 10:
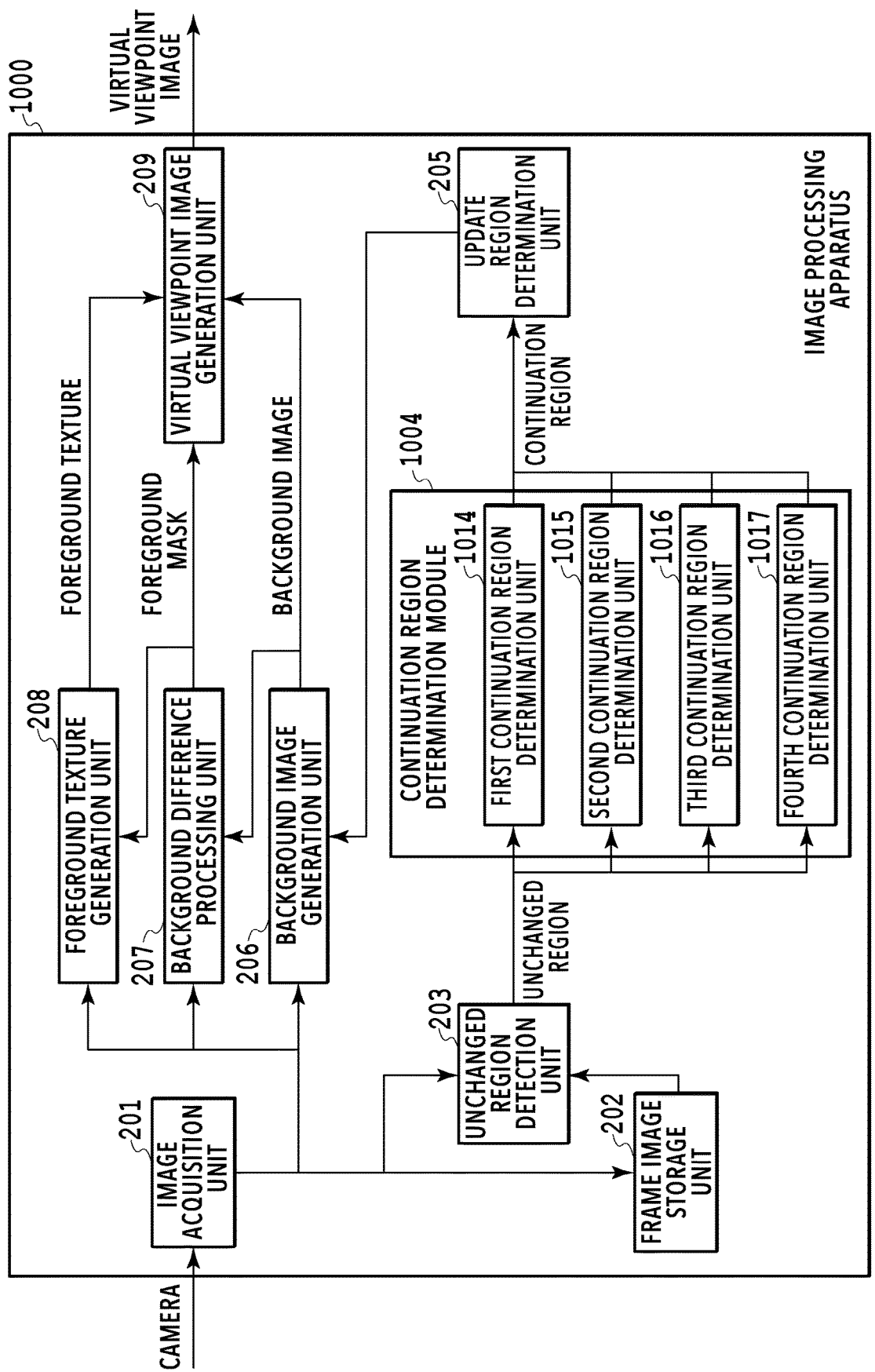
FIG. 10 is a diagram showing an internal configuration of another image processing apparatus.

FIG. 10 is a block diagram showing an image processing apparatus 1000 of this embodiment. The constituents which are the same as those in the first embodiment will be denoted by the same reference numerals and explanations thereof will be omitted. In this embodiment, a continuation region determination module 1004 is formed from multiple (N pieces of) continuation region determination units. FIG. 10 illustrates the case where N=4. Specifically, the continuation region determination module 1004 includes a first continuation region determination unit 1014, a second continuation region determination unit 1015, a third continuation region determination unit 1016, and a fourth continuation region determination unit 1017.

The same unchanged region is continuously inputted from the unchanged region detection unit 203 to the respective continuation region determination units. The respective continuation region determination units are operated so as to determine the continuation regions independently while shifting phases by 1/N (N=4), and the respective continuation region determination units output the continuation regions in sequence. The respective continuation regions thus outputted are sent to the update region determination unit 205. The update region determination unit 205 determines the update regions in terms of the respective continuation regions, and outputs the determined update regions to the background image generation unit 206.

Figure 11:
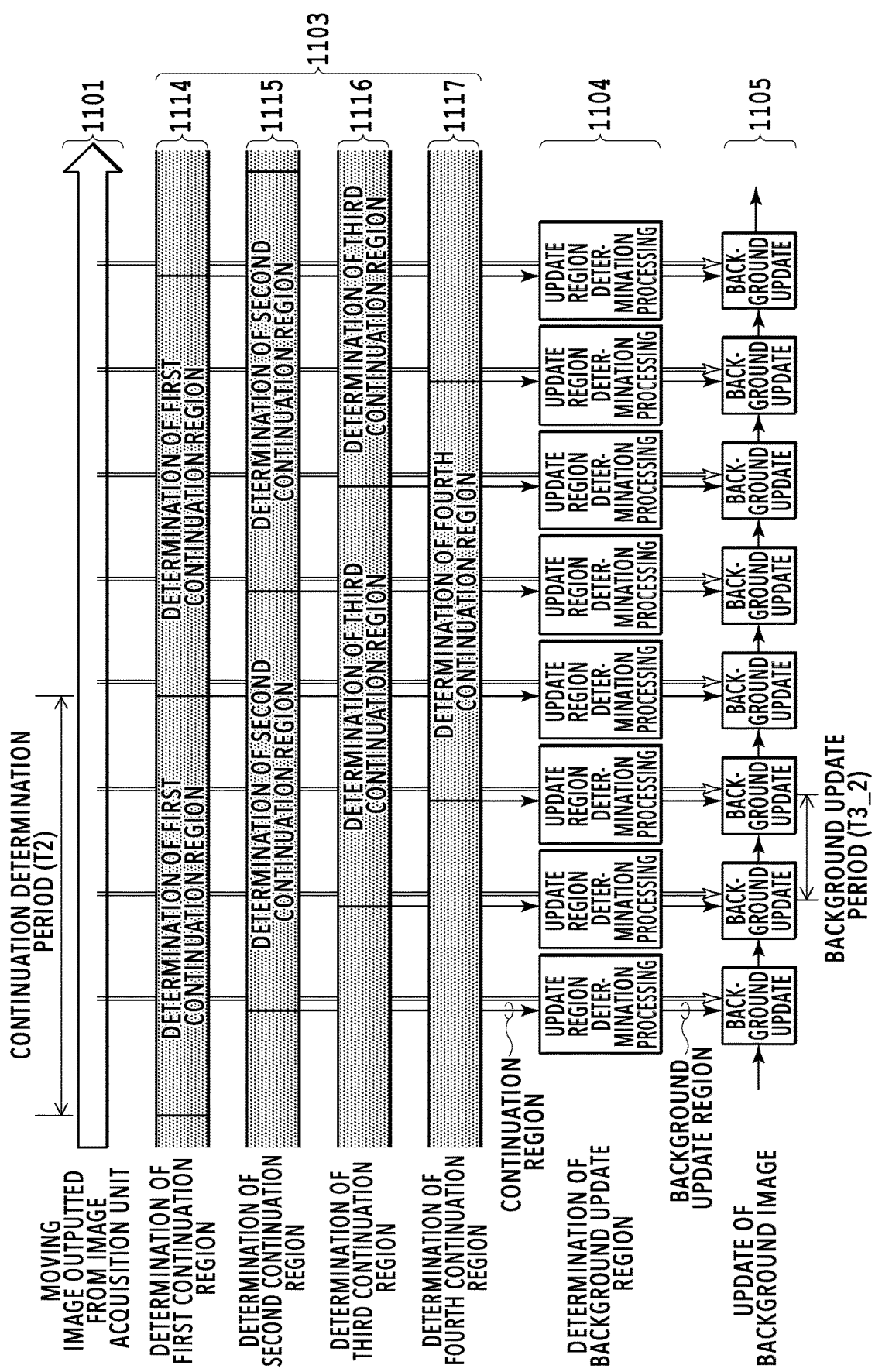
FIG. 11 is a diagram explaining the processing to generate the background image.

FIG. 11 is a diagram explaining the processing to generate the background image according to the second embodiment. As with FIG. 5, FIG. 11 shows a diagram in which the time axis moves from left to right. As with the item 501 in FIG. 5, an item 1101 in FIG. 11 represents a moving image to be outputted from the image acquisition unit 201. The description of the actions of the unchanged region detection unit 203 (which correspond to the item 502 in FIG. 5) is omitted in FIG. 11.

An item 1103 in FIG. 11 represents actions of the continuation region determination module 1004. Specifically, an item 1114 represents actions of the first continuation region determination unit 1014. An item 1115 represents actions of the second continuation region determination unit 1015. An item 1116 represents actions of the third continuation region determination unit 1016. An item 1117 represents actions of the fourth continuation region determination unit 1017.

Each continuation region determination unit is operated at a cycle of the continuation determination period T2 while shifting its phase by a quarter of the period T2. Moreover, each continuation region determination unit outputs the continuation region to the update region determination unit 205 at the end of the continuation determination period T2.

An item 1104 in FIG. 11 represents actions of the update region determination unit 205. The update region determination unit 205 determines the background update region based on the continuation region outputted from each continuation region determination unit. As described in the first embodiment, the spatial filter processing is performed in the case of determining the background update region.

An item 1105 in FIG. 11 represents actions of the background image generation unit 206. The background image generation unit 206 updates the background image by using the newest frame image in each continuation determination period T2, for instance, based on the background update region outputted from the update region determination unit 205.

As described above, in this embodiment, each of the four continuation region determination units is operated at the cycle of the continuation determination period T2 with its phase shifted by the ¼ cycle from one another. For this reason, a background update period T3_2 in the second embodiment is a quarter as large as the background update period T3_1 in the case of the first embodiment in FIG. 5. While this embodiment describes the case in which the number (N) of the continuation region determination units is set to 4, this number N can be set to any number equal to or above 2 instead. By setting the larger number N, it is possible to set the longer continuation determination period T2 and to set the shorter background update period T3_2. In the meantime, the example of evenly shifting the phases based on the number N of the continuation region determination units is described in this embodiment as the method of sequentially shifting the phases. However, the present invention is not limited to this configuration. For instance, the phases may be shifted unevenly. As described above, according to the second embodiment, it is possible to improve the stability of the background image and the performance of the background image to track the change in environment at the same time.

Third Embodiment

A third embodiment is based on the assumption that an image inputted from a camera contains swing and shake factors and the image acquisition unit 201 has poor or no stabilization functions on the other hand.

Figure 12:
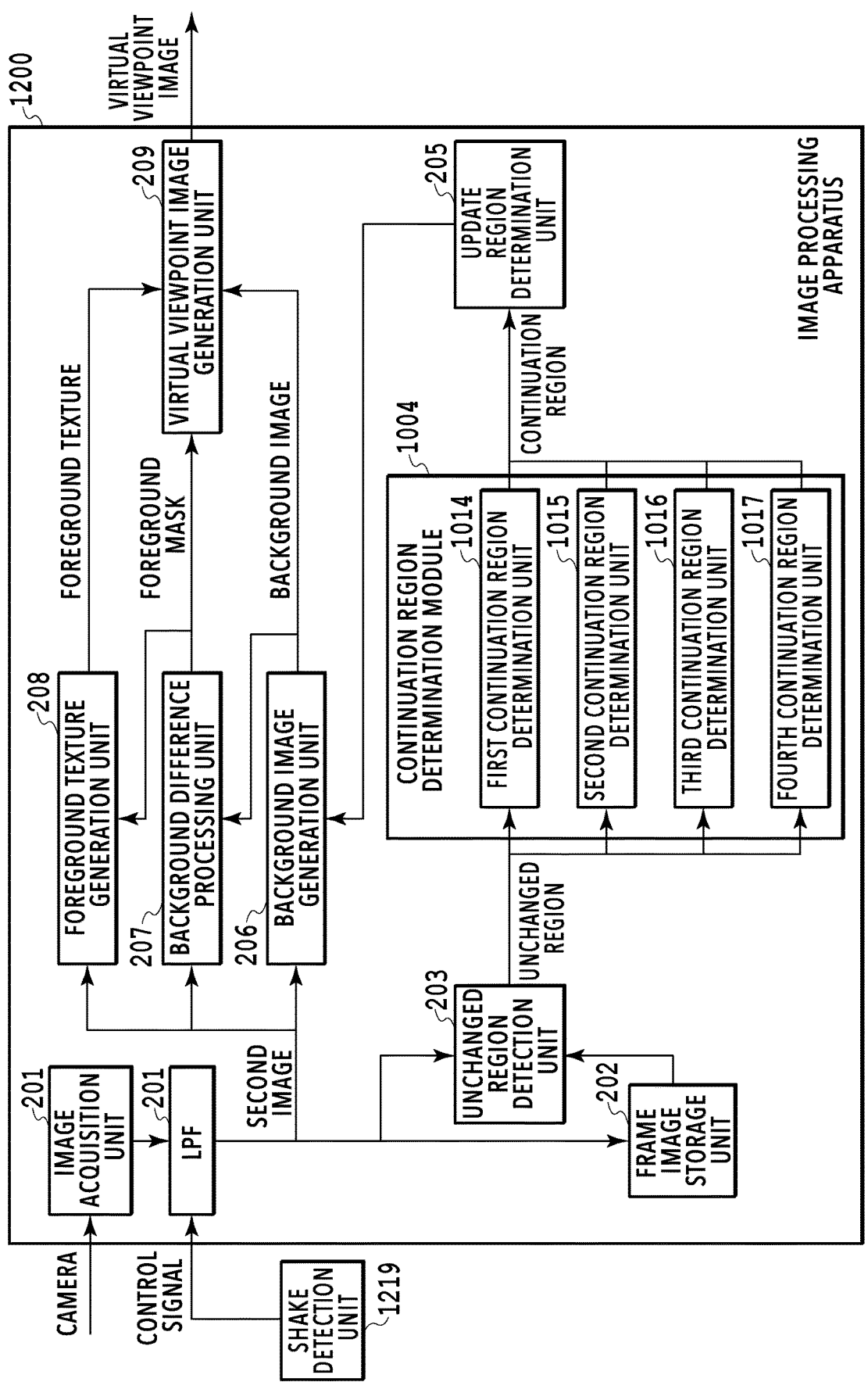
FIG. 12 is a diagram showing an internal configuration of another image processing apparatus.

FIG. 12 is a diagram showing an exemplary block diagram of an image processing apparatus 1200 of the third embodiment. The image processing apparatus 1200 is configured to be capable of receiving a control signal from a shake detection unit 1219. Moreover, the image processing apparatus 1200 includes a low-pass filter (LPF) 1218. Structures of other constituents are the same as those described in the second embodiment. Though this embodiment shows an aspect derived from the second embodiment, this embodiment may be derived from the first embodiment instead.

The LPF 1218 receives the frame image outputted from the image acquisition unit 201 and generates a second image by suppressing spatial high-frequency components in the frame image.

The shake detection unit 1219 detects a state of shake of the camera by using a physical measure like an acceleration sensor or a gyroscope, and sends out a control signal for controlling the LPF 1218 in accordance with a detected level. For instance, the LPF 1218 is designed to be operated at a maximum number of taps of 7×7. The shake detection unit 1219 is designed to output any of control instruction values of 1, 3, 5, and 7 each indicating a shake level depending on the shake level detected by itself. In response to the control instruction value thus transmitted, the LPF 1218 can change a filter coefficient such that an effective filter size (the number of taps) satisfies any of 1×1, 3×3, 5×5, and 7×7, for example.

The second image thus obtained is sent to the frame image storage unit 202, the unchanged region detection unit 203, the background image generation unit 206, the background difference processing unit 207, and the foreground texture generation unit 208.

In other words, in the third embodiment, each of the determination of the unchanged region, the determination of the continuation region, the determination of the background update region, and the generation of the background image is carried out based on the second image that is passed through the LPF 1218. As a consequence, it is possible to generate the background image appropriately even in the case where the image inputted from the camera contains shake and other factors.

Moreover, in this embodiment, each of the background image, the foreground mask, and the foreground texture is also generated based on the second image. If the foreground texture is generated from the second image, a blurry foreground texture is obtained due to an effect of the LPF 1218. There may be case where a blurry foreground is acceptable and this embodiment is useful for obtaining the blurry foreground texture in that case.

Other Embodiments

While the first, second, and third embodiments have been described in detail, the present invention is also adaptable to embodiments in various forms including a system, an apparatus, a method, a program, and a storage medium (a memory medium), for example. To be more precise, the present invention is adaptable to a system including multiple instruments (including a host computer, an interface device, an image capturing apparatus, and web applications, for example). Alternatively, the present invention is adaptable to an apparatus consisting of a single instrument.

In the meantime, each of the above-described embodiments discusses the case in which the single image processing apparatus 200 obtains the image data from the multiple cameras and generates the background images, the foreground masks, and the foreground textures regarding the respective cameras. However, the present invention is not limited to this configuration. For example, the present invention is applicable to a case in which a hardware component in each camera or an image processing apparatus annexed to each camera may be equipped with the functions except the function of the virtual viewpoint image generation unit. Moreover, the present invention is also applicable to a case in which each camera is configured to generate the background image, the foreground mask, and the foreground texture and the respective data thus generated are transmitted to the apparatus configured to generate the virtual viewpoint image.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-175088, filed Sep. 19, 2018, which is hereby incorporated by reference wherein in its entirety.

What is claimed is:

1. An image processing apparatus comprising:
one or more memories that store instructions; and
one or more processors that execute the instructions to:
obtain images which are captured by an image capturing device in a specific period including a plurality of detection periods,
detect a first region for a detection period based on the obtained images, the first region being formed from pixels each having a change in pixel value below a threshold in the detection period,
specify a second region where a plurality of detected first regions overlap, and
update a background image based on any of the obtained images and the specified second region,
wherein the specific period corresponds to a period to update the background image.

2. The image processing apparatus according to claim 1, wherein the background image is updated by using a newest image among the obtained images.

3. The image processing apparatus according to claim 1, wherein the second region is specified in each of the plurality of the detection periods to be started at different timings from one another.

4. The image processing apparatus according to claim 3, wherein the one or more processors further execute the instructions to specify a third region by performing image processing on an image that represents the respective specified second regions.

5. The image processing apparatus according to claim 1, wherein the one or more processors further execute the instructions to separate, based on the updated background image, a foreground region from a background region in each of images which are captured by the image capturing device in another specific period.

6. The image processing apparatus according to claim 5, wherein the foreground region includes pixels each determined to have a difference equal to or above a threshold between the updated background image and any of the images which are captured by the image capturing device in the another specific period.

7. The image processing apparatus according to claim 1, wherein the one or more processors further execute the instructions to specify a third region by performing image processing on an image representing the specified second region.

8. The image processing apparatus according to claim 7, wherein the image processing comprises spatial processing.

9. The image processing apparatus according to claim 7, wherein the image processing comprises smoothing processing using a spatial filter.

10. The image processing apparatus according to claim 7, wherein the image processing comprises expansion processing and contraction processing.

11. The image processing apparatus according to claim 7, wherein the background image is updated by using pixel values of pixels in a region which is included in any of the obtained images and corresponds to the third region.

12. The image processing apparatus according to claim 1, wherein the plurality of detection periods do not overlap each other.

13. An image processing apparatus, comprising:
one or more memories that store instructions; and
one or more processors that execute the instructions to:
obtain images which are captured by an image capturing device in a specific period including a plurality of detection periods,
detect a first region for a detection period based on the obtained images, the first region being formed from pixels each having a change in pixel value below a threshold in the detection period,
specify a second region where a plurality of detected first regions overlap, the second region being specified in each of the plurality of the detection periods to be started at different timings from one another and being specified by sequentially shifting timings in an amount equivalent to a value obtained by dividing a total period of the plurality of the detection periods by a number of the second regions to be specified, and
update a background image based on any of the obtained images and the specified second region.

14. An image processing apparatus comprising:
one or more memories that store instructions; and
one or more processors that execute the instructions to:
obtain images which are captured by an image capturing device in a specific period including a plurality of detection periods,
detect a first region for a detection period based on the obtained images, the first region being formed from pixels each having a change in pixel value below a threshold in the detection period,
specify a second region where a plurality of detected first regions overlap, the second region being specified in each of the plurality of the detection periods to be started at different timings from one another, and
update a background image based on any of the obtained images and the specified second region,
wherein a sum of the plurality of detection periods is longer than a period to generate the background image.

15. An image processing apparatus comprising:
one or more memories that store instructions; and
one or more processors that execute the instructions to:
obtain images which are captured by an image capturing device in a specific period including a plurality of detection periods,
perform image processing each of the obtained images using a low-pass filter,
detect a first region for a detection period based on the obtained images after image processing is performed, the first region being formed from pixels each having a change in pixel value below a threshold in the detection period,
specify a second region where a plurality of detected first regions overlap, and
update a background image based on any of the obtained images and the specified second region.

16. The image processing apparatus according to claim 15, wherein the specific period corresponds to a period to update the background image.

17. An image processing apparatus, comprising:
one or more memories that store instructions; and
one or more processors that execute the instructions to:
obtain images which are captured by an image capturing device in a specific period including a plurality of detection periods,
detect a first region for a detection period based on the obtained images, the first region being formed from pixels each having a change in pixel value below a threshold in the detection period, specify a second region where a plurality of detected first regions overlap, update a background image based on any of the obtained images and the specified second region, obtain images captured from multiple viewpoints, and generate a virtual viewpoint image based on the updated background image and the obtained images captured from multiple viewpoints.

18. A method of controlling an image processing apparatus, the method comprising:

obtaining images which are captured by an image capturing device in a specific period including a plurality of detection periods;

detecting a first region based for a detection period on the obtained images, the first region being formed from pixels each having a change in pixel value below a threshold in the detection period;

specifying a second region where a plurality of the detected first regions overlap; and updating a background image based on the obtained images and any of the specified second region, wherein the specific period corresponds to a period to update the background image.

19. A non-transitory computer readable storage medium storing a program which causes a computer to perform the steps of:

obtaining images which are captured by an image capturing device in a specific period including a plurality of detection periods;

detecting a first region for a detection period based on the obtained images, the first region being formed from pixels each having a change in pixel value below a threshold in the detection period;

specifying a second region where a plurality of the detected first regions-overlap; and updating a background image based on the obtained images and any of the specified second region, wherein the specific period corresponds to a period to update the background image.

20. An image processing method comprising:

obtaining images which are captured by an image capturing device in a specific period including a plurality of detection periods, detecting a first region for a detection period based on the obtained images, the first region being formed from pixels each having a change in pixel value below a threshold in the detection period, specifying a second region where a plurality of detected first regions overlap, updating a background image based on any of the obtained images and the specified second region, obtaining images captured from multiple viewpoints, and generating a virtual viewpoint image based on the updated background image and the obtained images captured from multiple viewpoints.

* * * * *